United States Patent [19]
Gregoire et al.

[11] Patent Number: 5,498,114
[45] Date of Patent: Mar. 12, 1996

[54] ENVELOPE FEED DEVICE INCORPORATING SCALES

[75] Inventors: Jean-Pierre Gregoire, Brie Comte Robert; Olivier Van Lierde, La Celle Saint Cloud, both of France

[73] Assignee: Neopost Industrie, Bagneux, France

[21] Appl. No.: 337,521

[22] Filed: Nov. 9, 1994

[30] Foreign Application Priority Data

Nov. 10, 1993 [FR] France .................................. 93 13441

[51] Int. Cl.⁶ ...................................................... G01G 13/00
[52] U.S. Cl. ........................ 414/21; 414/797.7; 177/120; 271/110; 271/114; 271/119
[58] Field of Search ........................ 414/21, 593, 797.7; 177/7, 60, 119, 120; 156/360, 362, 363, 364; 271/2, 110, 114, 119

[56] References Cited

U.S. PATENT DOCUMENTS

| | | | |
|---|---|---|---|
| 2,970,820 | 2/1961 | Sepich | 177/60 |
| 3,371,526 | 5/1965 | Fathauer | 414/21 |
| 3,443,651 | 5/1969 | White | 177/60 |
| 3,855,041 | 12/1974 | Kunisch | 271/2 |
| 3,877,531 | 4/1975 | Storace et al. | 177/1 |
| 4,276,112 | 6/1981 | French et al. | 156/360 |
| 4,568,074 | 2/1986 | Murayoshi | 271/119 |
| 4,850,510 | 7/1989 | Inoue et al. | 271/119 |
| 4,850,580 | 7/1989 | Denzin et al. | 414/797.7 |
| 4,935,078 | 6/1990 | Bergman et al. | 156/364 |
| 4,973,037 | 11/1990 | Holbrook | 414/797.7 |
| 5,001,648 | 3/1991 | Baker . | |

FOREIGN PATENT DOCUMENTS

| | | |
|---|---|---|
| 2604105 | 3/1988 | France . |
| 2668725 | 5/1992 | France . |
| 2217310 | 10/1989 | United Kingdom . |
| WO9114238 | 9/1991 | WIPO . |

Primary Examiner—Michael S. Huppert
Assistant Examiner—Douglas A. Hess
Attorney, Agent, or Firm—Sughrue, Mion, Zinn, Macpeak & Seas

[57] ABSTRACT

The feed device includes a platform (9) adapted to receive at least one mail item (4; 4A, 4B) laid flat on it and a plurality of rollers (10) each having a flat (10B). Said rollers are mounted to rotate under the platform to occupy alternately a first position in which they remain below the platform and a second position in which they project above the platform. A weight sensor (30) is mounted under the platform to carry it, said sensor being responsive to vertical displacement of the platform to deliver a signal (C) indicative of the load applied to it when the rollers are all substantially in said first position.

8 Claims, 3 Drawing Sheets

ENVELOPE FEED DEVICE INCORPORATING SCALES

The invention concerns a device for feeding mail items to a franking machine or "postage meter", the device including a platform adapted to receive at least one mail item laid flat on it and a plurality of rollers each having a flat, said rollers being mounted to rotate under the platform to occupy alternately a first position in which they remain below the platform and a second position in which they project above the platform.

A feed device of this kind is described in document GB-A-2 217 310. It is designed primarily to be fitted to a modular franking machine for mail dispatching including a franking module on the exit side of the feed device or module along the circuit on which mail items are processed in the machine. In this prior art mail dispatching machine scales are disposed between the feed module and the franking module. In this system, a stack of mail items, such as a stack of envelopes, is deposited onto the platform of the feed module which feeds the envelopes out one by one to the scales. The scales determine the mass of each envelope received from the feed device, and where appropriate the corresponding franking amount on the basis of mailing criteria laid down by the postal authority, and supply the weighed envelope and the data indicating its mass or the franking amount to the franking module which applies to the envelope the imprint appropriate to the franking amount. In the above document, the particular shape of the rollers is intended to apply to the envelope at the bottom of the stack of envelopes (that resting on the platform) a pulsed friction traction force which helps to separate the envelope cleanly from the remainder of the stack of envelopes.

A similar mail item feed device is described in document FR-A-2 668 725.

Until now, a mail dispatching machine has included between its entry and its exit at least three separate modules connected in series to feed successive mail items onto a weighing platform (if necessary after first separating it from a stack of mail items deposited on the platform of the feed module), to weigh the mail items to calculate the franking amount, to feed the mail items under a printhead for printing a postal imprint, to frank the mail item and to eject it from the machine.

An object of the invention is to propose a solution to the problem of reducing the number of modules constituting a mail dispatching machine so as to reduce its overall size.

Another object of the invention is to improve the performance of a mail dispatching machine of this kind by reducing the length of the path that a mail item takes between its entry and its exit, without calling into question its modular design.

In accordance with the invention, at least one weight sensor is mounted under the platform to carry it, said sensor being responsive to vertical displacement of the platform to deliver a signal indicative of the load applied to the latter when the rollers are all substantially in said first position. Thus the platform of the feed device serves as a weighing platform when the rollers occupy a position in which they are all under the platform.

Consequently, in accordance with the invention, the scales are integrated into the feed device so that a mail dispatching machine including this kind of feed device is compact and the path taken by a mail item from the entry to the exit of a mail dispatching system of this kind is reduced commensurately.

A strain gauge sensor is very suitable for use as the weight sensor as it delivers a signal proportional to the load applied to it.

The feed device of the invention is equally well suited to continuous and individual feeding, i.e. it can accept a stack of mail items or a single mail item deposited manually on the platform. When adapted to operate continuously it can enhance the performance of the mail dispatching machine using it because the mass of each mail item that it feeds out, after separating it from the stack of mail items, can be determined from the difference between the mass of the stack of mail items before and after separating the mail item from the stack of mail items, i.e. during the time interval between two successive operations of separating a mail item from the stack of mail items in a conventional continuous feed device. There is therefore no need for any additional stationary period to determine the mass of a mail item after separating it from a stack of mail items, as in prior art mail dispatching machines.

The arrangement with the rollers for displacing a mail item across the platform dissociated mechanically from the platform and the weight sensor avoids induced vibration of the weight sensor.

One embodiment of the invention is described in detail below with reference to the drawings.

Referring to FIGS. 1 to 4, the feed module is adapted to feed individual envelopes or other mail items. It includes a substantially rectangular platform 9 with a "letter-guide" lip 8. The platform is mounted on a base 12 and receives an envelope 4 (or a stack of envelopes in the case of a continuous feed device).

Figure 1:
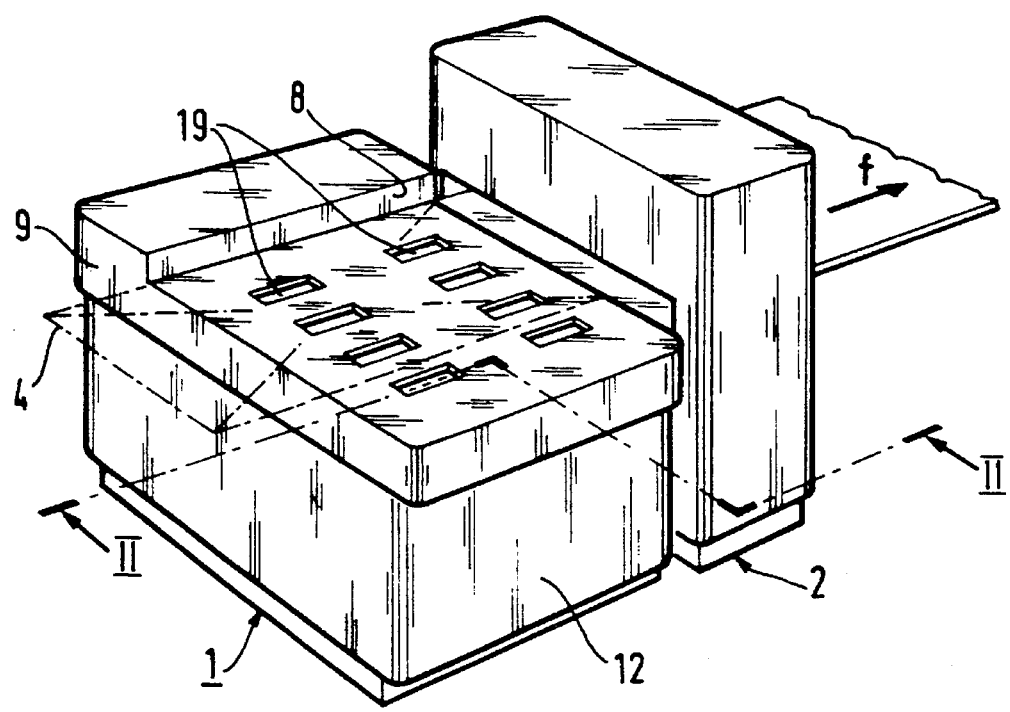
FIG. 1 is a perspective view of a modular franking machine including an envelope feed module which integrates scales and a franking module on the exit side of the feed module.
Figure 2:
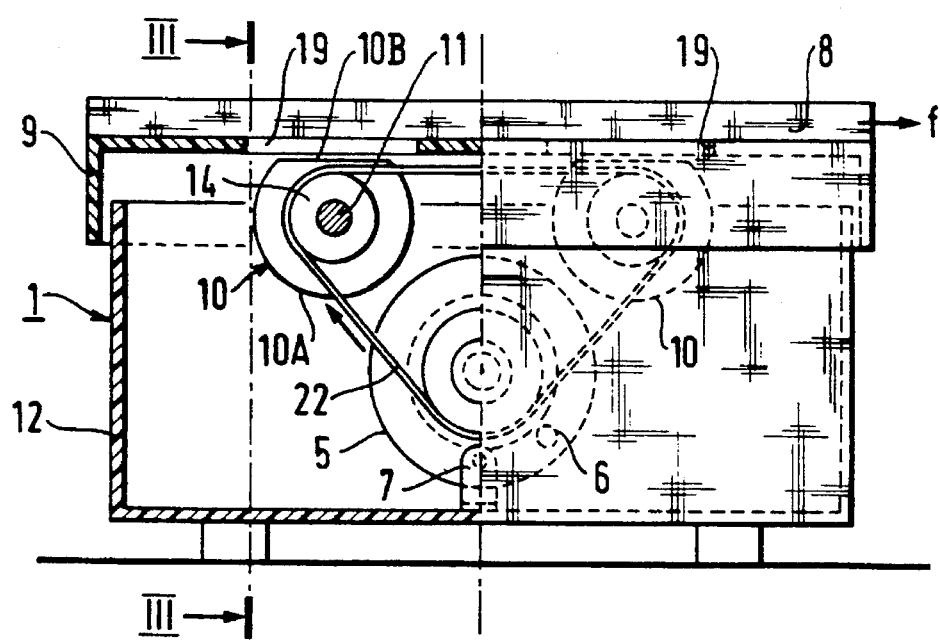
FIG. 2 is a view of the feed module from FIG. 1 in section on the line II—II.
Figure 3:
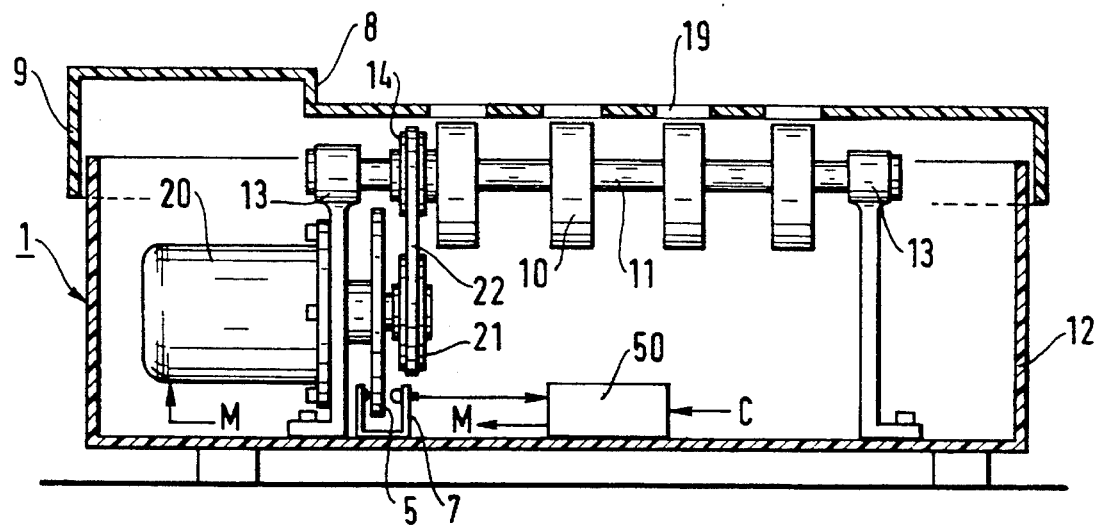
FIG. 3 is a view of the feed module from FIG. 1 in section on the line III—III in FIG. 2.

Drive rollers 10 are rotatably mounted in the base 12. They move an envelope 4 (FIG. 1) laid flat on the platform to the righthand edge of the platform (as seen in FIG. 1). The envelope is then moved across the platform by the rollers in a feed direction indicated by the arrow f. The rollers 10 are axially aligned in two rows of four (FIG. 4) and keyed angularly relative to the feed direction. The number of rollers naturally depends on the type of mail item to be processed and on the size of the platform.

Each roller 10 is in the form of a cylinder with a circular sector 10A and a plane sector 10B forming a flat. The rollers 10 are mounted on a rotary drive shaft 11. In the figures, four rollers are mounted on a first shaft and four other rollers are mounted on a second shaft parallel to the first shaft. Each shaft 11 is mounted in two bearings 13 attached to the base 12. Slots 19 in the platform 9 each facing one of the rollers enable the circular sector 10A of each roller 10 to project through the platform 9.

The shafts 11 are positioned vertically and relative to the platform so that for an angular position of the rollers 10 in which the plane sectors 10B of the rollers are horizontal, the plane sector 10B of each roller faces the respective slot 19 without the roller projecting through the surface of the platform (i.e. it remains below the surface of the platform). For a different angular position of the rollers (in which the plane sectors 10B of the rollers are no longer horizontal) the circular sector 10A of each roller passes through the respective slot 19 (i.e. projects above the surface of the platform).

A drive motor 20 in the base 12 drives the rollers 10 through a transmission system. This transmission system includes a pulley 21 mounted on the drive motor shaft and two pulleys 14 mounted on the respective shafts 11. The pulley 21 is coupled to the pulleys 14 by a drive belt 22 around the pulleys 14 and 21. As an alternative to this, the motor 20 is not in the base 12 but rather in the franking module 2 on the exit side of the feed module 1 (FIG. 1). In this case a suitable mechanical transmission system is required between the shafts 11 and the drive motor 20.

When a roller is in its first angular position its plane sector 10B is not in contact with the envelope 4 laid flat on the platform 9. When the roller occupies a different angular position its circular sector 10A is in contact with the envelope and raises it above the platform. When the rollers 10 are rotated the envelope resting flat on the platform 9 is fed across the latter in steps as the rollers occupy their first and second positions alternately. In the case of a continuous feed module in which the platform 9 receives a stack of envelopes, this alternation in the angular position of the rollers 10 facilitates separation of the last envelope from the stack of envelopes.

Figure 5:
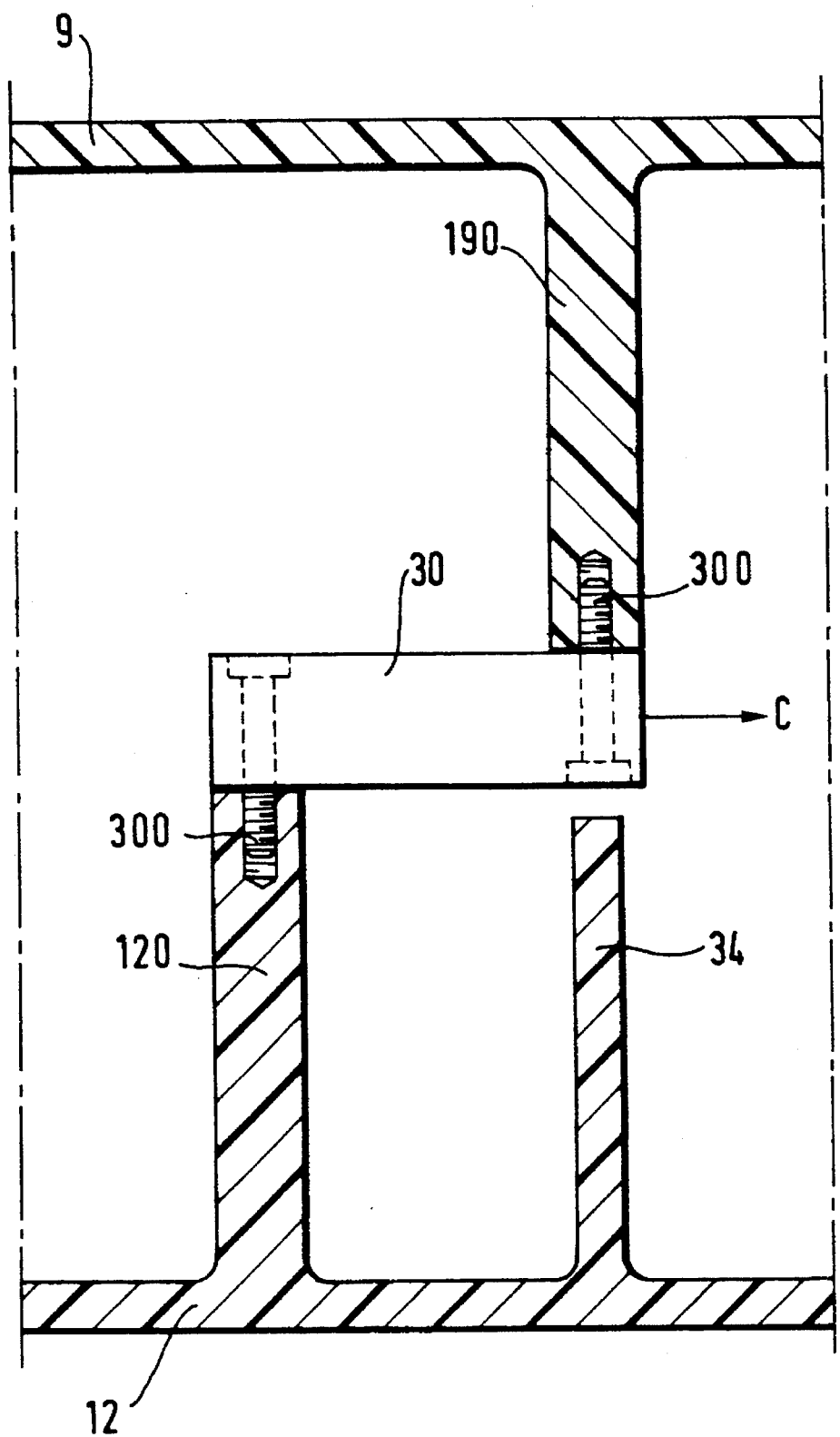
FIG. 5 is a diagrammatic view showing the mounting of a weight sensor between the platform and the base of the feed device integrating the scales.

The platform 9 mounted on the base 12 is also a plate for weighing envelopes. One or more weight sensors is (or are) disposed between the platform 9 and the base 12 so that they support the platform. In the case of an individual feed module a single weight sensor is sufficient. In the case of a continuous feed module it is preferable to use four weight sensors 30 with the same sensitivity at respective corners of the platform. This arrangement has the advantage that heavy stacks of envelopes can be processed without limitations set by the physical and/or geometrical characteristics of a single weight sensor. FIG. 5 shows diagrammatically the mounting of a sensor 30 between the platform 9 and the base 12. The sensor 30 is a strain gauge sensor such as that marketed by the company "SCAIME". It is mounted between a column 190 which is part of the platform (moulded in one piece with it, for example) and a column 120 which is part of the base (moulded in one piece with the latter), one end being fixed rigidly to the column 190 by screws 300 and the other end being fixed rigidly to the column 120 by screws 300. With envelope(s) on the platform 9 the sensor 30 is deformed vertically by the joint action of the two columns and generates a signal C representing the weight of the platform and the load applied to the platform, for example by an envelope or a stack of envelopes resting on the latter. Vertical displacement of the platform (possible by virtue of elastic deformation of the sensor 30 in the vertical direction) is typically in the order of 0.3 mm. This displacement must naturally be less than the difference between the radii of a roller measured to any point on its circular sector 10A and to any point on its plane sector 10B.

The weighing device comprising the platform 9 and the weight sensor(S) 30 is decoupled from the conveyor device comprising the platform and the rollers 10. In a weighing position of the platform 9 the rollers 10 are therefore in their first angular position and therefore are not in contact with the envelope resting on the platform. In this case the signal generated by the weight sensor 30 (or by each weight sensor 30) is representative of the load applied to the weighing plate. Each weight sensor is advantageously protected from excessive overloading of the weighing plate by an abutment 34 operative between the sensor and the base 12 to prevent accidental damage to the weight sensor. Part of the base (moulded in one piece with it, for example), the abutment 34 extends under the platform to limit its vertical displacement. Referring to FIG. 5, the end of the abutment is 2 mm or 3 mm below the sensor 30 to limit its deformation.

An electronic circuit 50 in the base 12 starts and stops the motor 20 (or the mechanical transmission system) driving the rollers 10. The motor is normally stopped by the circuit 50 when the rollers are in their first angular position (flat 10B horizontal) to carry out a weighing operation in which the load applied to the platform is determined on the basis of the signal C supplied by each sensor 30. When the motor 20 is started the rollers turn and occupy alternately their first and second positions and the envelope resting on the platform is moved in the direction f until it leaves the platform. The circuit 50 then stops the rollers rotating again by stopping the motor 20, preferably with the rollers in the first position so that a new weighing operation can be started.

The time at which the circuit must stop the motor 20 to stop the rollers 10 in their first angular position is defined by a signal supplied to the control circuit 50 by a photo-electric cell 7 mounted in the base 12. This cell co-operates with a ring 5 rotationally coupled to the rollers so that a window 6 in the ring 5 is sensed by the cell 7 when the rollers are in substantially their first angular position. This ring is mounted on the shaft of the motor 20, for example.

In addition to the signals C from the sensors 30, the circuit 50 receives signals from other sensors to indicate the position on the platform of a mail item whose mass is to be determined. The circuit outputs control signals (e.g. the signal M) to stop or start the motor 20 and to set or release a brake (not shown) operative on the shafts 11 and adapted to stop the rollers quickly in their first angular position.

The circuit 50 is preferably a microprocessor whose operation is easy to modify by loading a different program. In particular, the mass of an envelope to be weighed can be determined in different ways depending on the program executed by the microprocessor.

In the case of an individual feed module the circuit 50 determines the mass of an envelope placed on the platform directly on the basis of the signal C generated when the rollers are in their first position.

In the case of a continuous feed module which can process a stack of envelopes the circuit 50 determines the mass of the envelope at the bottom of the stack in the following manner. First it determines the mass of the stack of envelopes on the basis of the signal C produced by the sensor(s) 30 with the rollers 10 in their first position at time t. It then starts the rollers 10 rotating to separate this envelope from the rest of the stack of envelopes. The envelope is therefore withdrawn from the stack of envelopes and leaves the platform. The circuit 50 stops the rollers rotating when they are in their first position. It then determines the mass of the stack of envelopes remaining on the platform on the basis of the signal C produced by the sensor(s) 30 at time t +t' where t' is the time needed to remove an envelope from the bottom of the stack. Finally, it determines the mass of the envelope just withdrawn from the stack of envelopes from the difference between the mass determined at time t and the mass determined at time t +t'.

To determine the mass of the stack of envelopes, or even a single envelope (individual feeder), the circuit 50 can use a matrix measurement method by comparing a first (digitized) transient signal from the sensor(s) 30 with a plurality of second transient signals previously stored in digitized form to identify a number deemed sufficient of similarities between the first transient signal and one second transient signal. The digitized transient signals can take the form of signatures to reduce the time needed for carrying out the weighing operation.

Figure 4:
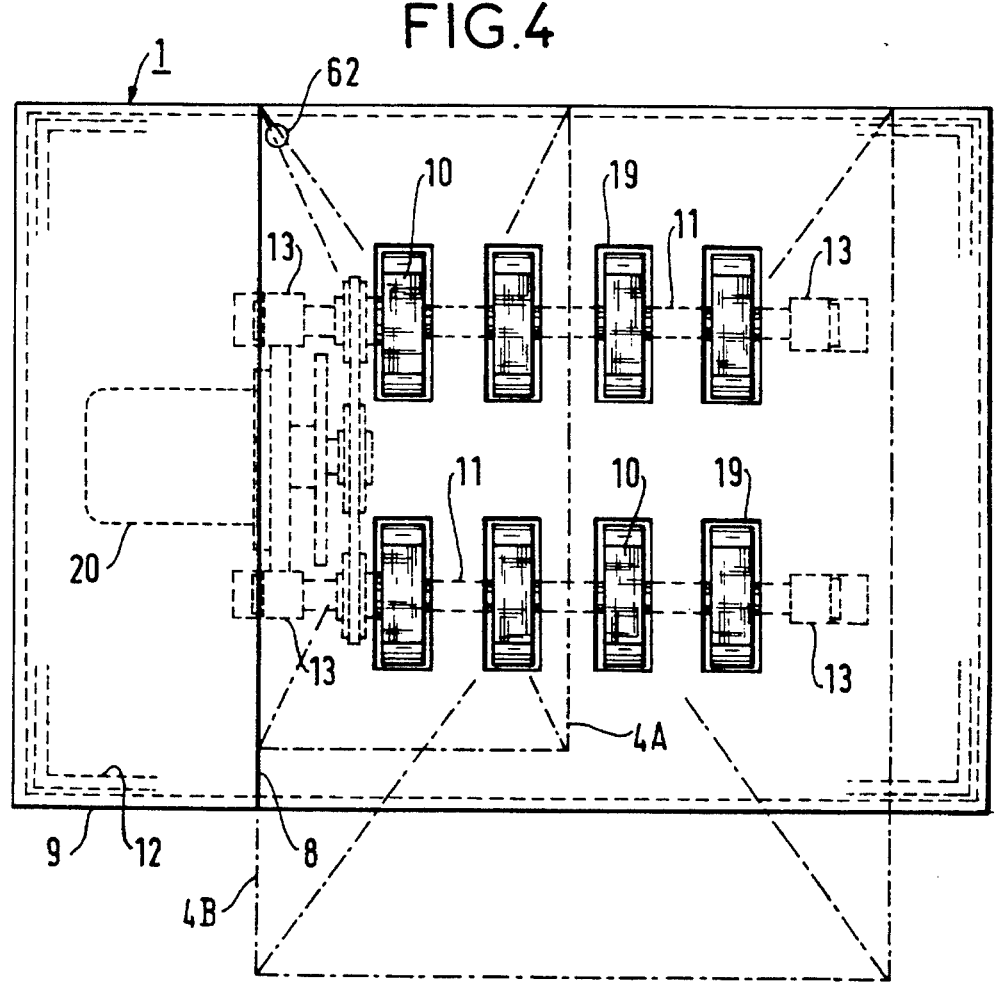
FIG. 4 is a plan view of the feed module from FIG. 1.

FIG. 4 shows a position sensor 62 which indicates the position of the envelope (two types of envelope are shown by two chain-dotted outline rectangles 4A and 4B) relative to the letter-guide lip 8 on the platform. According to whether the sensor 62 detects the presence or the absence of an envelope in the selected part of the platform, the circuit 50 deduces whether the envelope is positioned correctly or not and either stops or does not stop the motor accordingly. The part of the platform in which the sensor 62 operates is chosen to avoid firstly a large gap between the edge of the envelope to be weighed and the letter-guide lip 8 and secondly the envelope overhanging the upper end (as seen in FIG. 4) of the platform 9. A position sensor like this is beneficial in preventing feeding and/or weighing errors.

A continuous or individual feed module of this kind is designed to be fitted to the franking machine shown in FIG. 1 which has a print mechanism such as a print drum, for example. The feed module 1 on the entry side of the franking module feeds the latter with envelopes 4 supplied to it one by one. When the franking module 2 receives an envelope it also receives the parameters indicating the mass of the envelope from the feed module, via a digital data communication line, for example.

The franking module determines a franking amount which is printed on the envelope by the print drum. This amount depends on the mass of the envelope and on its size (length, width and thickness). It is advantageous to determine the dimensions of the envelope to be franked as quickly as possible to speed up the processing of envelopes, especially if the feed module is of the continuous type and includes an envelope separator. To allow this a sensor can be provided to sense the passage of an envelope along the platform and the length of the envelope can be determined on the basis of the speed at which the envelope moves along the platform. The circuit 50 can also use a sensor like this on the exit side of the separator to stop the roller drive motor when the envelope leaves the feed device. If other sensors like this are disposed along a line transverse to the direction in which the envelope moves along the platform, the width of the envelope can be determined. The thickness of the envelope can be determined by an opto-electronic or oscillating arm potentiometer sensor and an angular position encoder. The signals from these various sensors can be sent direct to the franking module or to the circuit 50 which can calculate a franking amount for the franking module.

We claim:

1. A device for feeding mail items to a franking machine, including a platform adapted to receive at least one mail item laid flat on said platform and a plurality of rollers, said rollers each having a flat portion and being mounted to rotate under the platform to occupy alternately a first position in which said rollers remain below the platform and a second position in which said rollers project above the platform, said device comprising at least one weight sensor mounted under the platform, said sensor being responsive to vertical displacement of the platform to deliver a signal indicative of a load applied to the platform when the rollers are all substantially in said first position.

2. A device according to claim 1, wherein four of said weight sensors are disposed under the platform which has a rectangular surface under each corner of which is one of the weight sensors.

3. A device according to claim 1, wherein each sensor is protected against overloading of the platform by an abutment disposed under the platform.

4. Feed device according to claim 1, wherein each weight sensor (30) is a strain gauge.

5. A device for feeding mail items to a franking machine, comprising:

a platform adapted to receive at least one mail item laid flat on said platform and a plurality of rollers, said rollers each having a flat portion and being mounted to rotate under the platform to occupy alternately a first position in which said rollers remain below the platform and a second position in which said rollers project above the platform;

at least one weight sensor mounted under the platform, said sensor being responsive to vertical displacement of the platform to deliver a signal indicative of a load applied to the platform when the rollers are all substantially in said first position; and control means connected to the weight sensor for commanding either rotation of the rollers to move said mail item on the platform to one end of the platform or halting of rotation of the rollers so that said rollers occupy said first position in order to begin a phase of weighing said mail item resting on the platform.

6. A device according to claim 5, wherein the control means command halting of rotation of the rollers in response to a signal supplied by a photo-electric cell cooperating with a ring rotationally coupled to the rollers.

7. A device according to claim 6, wherein the control means are adapted to operate in the following manner when a stack of mail items is resting on the platform:

a) to determine the mass of the stack of mail items resting on the platform in response to the signal supplied by each sensor if the rollers occupy the first position;

b) to command rotation of the rollers to separate a first mail item from the stack of mail items;

c) to command halting of rotation of the rollers when the rollers occupy the first position and said first mail item has been extracted from the stack;

d) to determine the mass of the stack of mail items resting on the platform in response to the signal supplied by each sensor;

e) to calculate the mass of said first item on the basis of the difference between the mass determined in step a) and the mass determined in step d).

8. A modular franking machine including a feed device for feeding mail items to a franking machine, said feed device comprising a platform adapted to receive at least one mail item laid flat on said platform and a plurality of rollers, said rollers each having a flat portion and being mounted to rotate under the platform to occupy alternately a first position in which said rollers remain below the platform and a second position in which said rollers project above the platform, said device comprising at least one weight sensor mounted under the platform, said sensor being responsive to vertical displacement of the platform to deliver a signal indicative of a load applied to the platform when the rollers are all substantially in said first position; and a franking module connected to interwork with the feed device so that the feed device feeds the franking module with mail items and simultaneously supplies the franking module with data indicative of the mass of the mail items or a franking amount of the mail items.

* * * * *